United States Patent [19]
Nepela et al.

[11] Patent Number: 5,452,168
[45] Date of Patent: Sep. 19, 1995

[54] THIN FILM MAGNETIC HEADS WITH MULTIPLE YOKES

[75] Inventors: Daniel A. Nepela, San Jose; Shih-Cheng Cheng, Milpitas; Erich P. Valstyn, Los Gatos; Edgar M. Williams, Palo Alto; Peter G. Bischoff, Cupertino, both of Calif.

[73] Assignee: Read-Rite Corporation, Milpitas, Calif.

[21] Appl. No.: 280,577

[22] Filed: Jul. 25, 1994

Related U.S. Application Data

[63] Continuation of Ser. No. 16,198, Feb. 11, 1993, abandoned, which is a continuation of Ser. No. 878,226, May 4, 1992, abandoned.

[51] Int. Cl.6 .......................... G11B 5/147; G11B 5/17
[52] U.S. Cl. ..................................... 360/126; 360/123
[58] Field of Search ................................ 360/126, 123

[56] References Cited

U.S. PATENT DOCUMENTS

| | | | |
|---|---|---|---|
| 4,223,360 | 9/1980 | Sansom et al. | 360/123 |
| 5,155,644 | 10/1992 | Kira et al. | 360/125 |
| 5,184,267 | 2/1993 | Mallary | 360/126 |
| 5,195,005 | 3/1993 | Mallary et al. | 360/126 |

FOREIGN PATENT DOCUMENTS

0400793  5/1990  European Pat. Off.
0005710  1/1979  Japan.

OTHER PUBLICATIONS

Shigeaki, Watanabe, "Thin Film Magnetic Head", Jan. 5, 1986, Abstract vol. 010260, Publication No. JP61085612.

Primary Examiner—Stuart S. Levy
Assistant Examiner—George J. Letscher
Attorney, Agent, or Firm—Nathan N. Kallman

[57] ABSTRACT

A thin film magnetic head is fabricated with a multiplicity of magnetic yokes that interact effectively with an electrical coil. The magnetic P1 and P2 pole sections of the yoke are very narrow and form closely spaced envelopes about the coil. The multiple yokes are inductively linked to the coil so as to provide an increased number of flux interactions for a given length of coil turn. With this magnetic head design, signal output is increased, thermal noise is reduced, and the signal-to-noise ratio is effectively improved.

9 Claims, 4 Drawing Sheets

THIN FILM MAGNETIC HEADS WITH MULTIPLE YOKES

This application is a continuation of patent application Ser. No. 08/016,198, filed Feb. 11, 1993 which is a continuation-in-part of patent application Ser. No. 07/878,226, filed May 4, 1992, now abandoned.

FIELD OF THE INVENTION

This invention relates to thin film magnetic heads and in particular to thin film head structures having multiple yokes.

BACKGROUND OF THE INVENTION

Thin film magnetic heads are used extensively in data processors, such as disk drives. A typical thin film head comprises, inter alia, a nonmagnetic ceramic substrate, a magnetic yoke consisting of first and second magnetic arms or poles with a transducing gap between pole tips, and an electrically conducting coil that is inductively linked with the yoke. The magnetic flux that is generated in the yoke interacts with current in the conducting coil to effectuate transducing of data signals during the write and read modes of the data processing unit. As the number of flux interactions between the yoke and the coil is increased, the voltage signal induced during data processing is increased accordingly.

In one known prior art thin film head assembly, such as described in published European patent application 400,793, multiple flux linkages are provided by intertwining a pair of magnetic arms of a single yoke with one or more coils. The yoke is woven through the opening of the coil and intertwined with the coil and makes at least two passes through the coil structure. The yoke arms of the device described in the afore-mentioned application extend longitudinally in one direction, whereas the coil structure extends longitudinally in a convoluted design in a direction perpendicular to the longitudinal direction of the yoke. It is apparent that the thin film head described in the referenced application requires a relatively long coil structure along the length of the yoke, which undesirably increases both the resistance of the coil and the reluctance of the magnetic circuit and results in increased thermal noise.

SUMMARY OF THE INVENTION

An object of this invention is to provide a thin film magnetic head that realizes a significantly higher record signal than that experienced with prior art thin film heads.

Another object of this invention is to provide a thin film magnetic head having lowered circuit resistance with a resultant reduction in thermal noise of the magnetic device an attendant increase in the signal-to-noise ratio of the device.

Another object is to provide a thin film head having reduced inductance, thereby affording an improved signal-to-noise ratio, particularly at high frequencies.

Another object is to provide a thin film head which allows an improved utilization of space and the surface area of a ceramic wafer on which a multiplicity of heads are deposited.

In one embodiment of this invention, a thin film magnetic head assembly is configured with multiple magnetic yokes that interact with at least one electrically conducting coil. Each magnetic yoke comprises first and second yoke arms or sections, designated as P1 and P2 sections respectively, that are joined in series at back and front closures to form a continuous magnetic flux path. The coil is preferably planar and is formed with a base close to the transducing gap, an opposing topside and two connecting sides. The multiple yokes are closely spaced about equidistantly along a direction parallel to the base and topside of the coil. The P2 sections of each yoke are superposed over respective P1 sections so that each yoke forms an envelope around the coil. The P1 and P2 sections of the yoke envelopes are substantially coextensive and aligned relative to each other in a direction orthogonal to the plane of the coil. The P1 and P2 yoke sections are connected to respective P2 and P1 yoke sections of adjacent yokes thereby forming a continuous magnetic flux path. A transducing gap is provided between the end of the P1 pole piece of the first yoke and the P2 pole piece of the last yoke. The multiple yoke envelopes interacting with the coil provide multiple linkages and significant increased inductive coupling. As a result, the output signal from the thin film head is substantially increased and thermal noise is greatly reduced.

In an alternative embodiment, the P1 yoke sections of the yoke envelopes that encompass the coil are oriented at an angle relative to the P2 yoke sections. The angled P1 yoke sections are parallel to each other and equally spaced. The P2 yoke sections are also equally spaced and are parallel to each other and to the sides of the planar coil.

In another embodiment, the P1 and P2 yoke sections are partially coextensive and partially not coextensive.

BRIEF DESCRIPTION OF THE DRAWING

The invention will be described in greater detail with reference to the drawing in which.

Similar numerals refer to similar elements in the drawings. It should be understood that the Figures of the drawings are not represented in true proportions.

DETAILED DESCRIPTION OF THE INVENTION

Figure 1A:
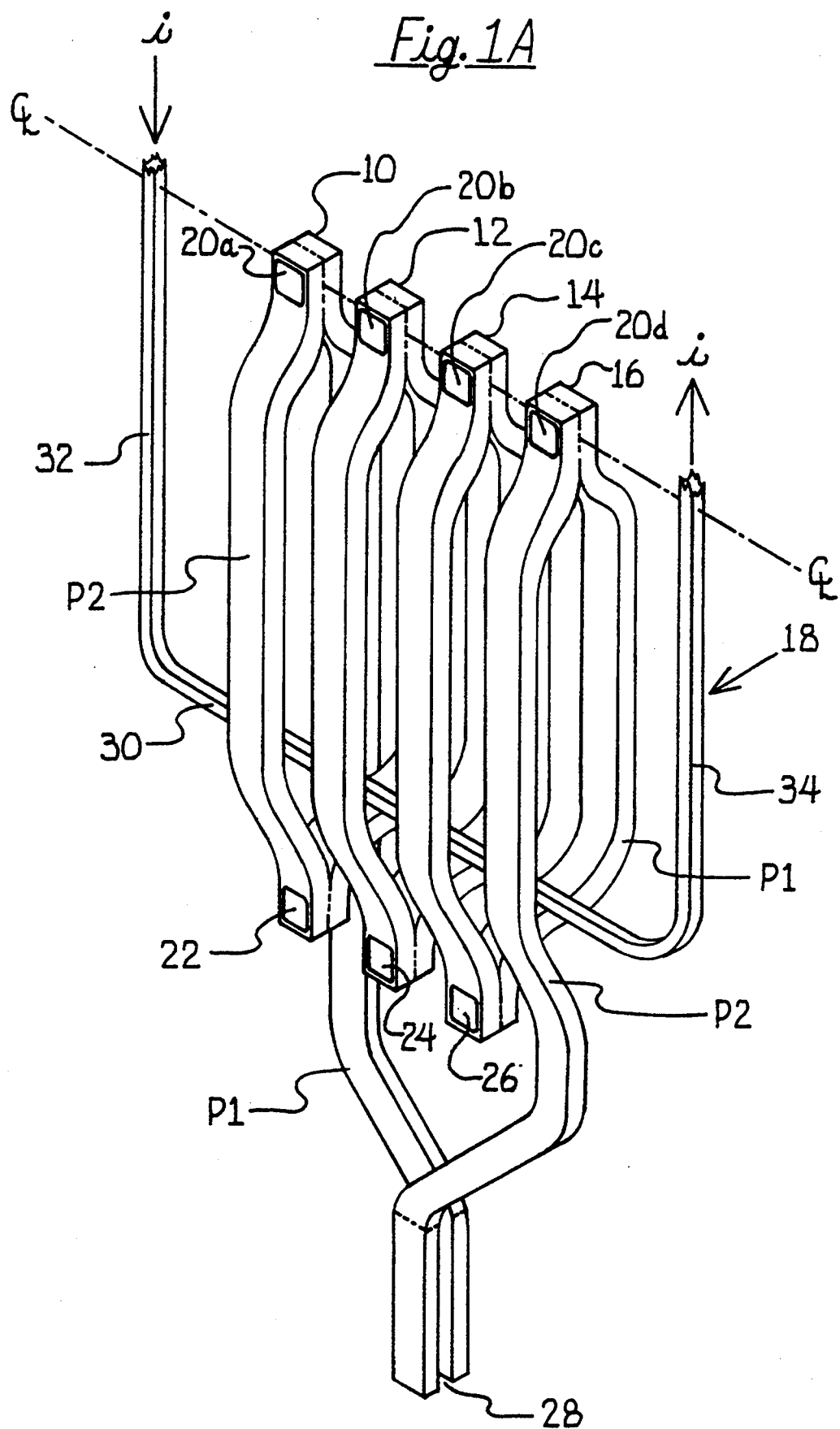
FIG. 1A is an isometric view representing a preferred embodiment of a thin film magnetic head assembly, made in accordance with this invention, with about one-half of the coil only shown.
Figure 1B:
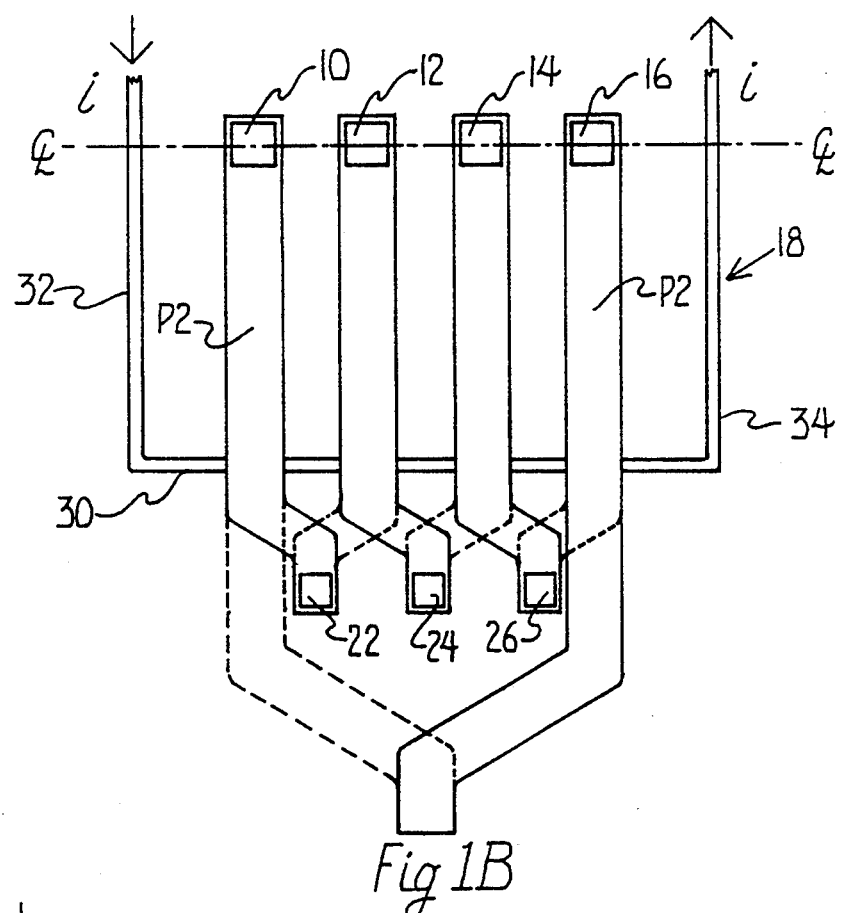
FIG. 1B is a plan view of the embodiment of FIG. 1A, but reduced in size.

With reference to FIGS. 1A and 1B, a thin film head is shown having a multiplicity of magnetic yokes 10, 12, 14, 16, made of Permalloy for example, that are inductively linked to an electrically conductive coil 18. Only one-half of the coil 18 is shown, with the centerline CL of the entire coil passing through vias 20a–20d. Each yoke comprises a first Permalloy section P1 and a second Permalloy section P2 that are connected respectively through the vias 20a–20d at back closures of the yokes and through vias 22, 24 and 26 at front closures. The P1 and P2 sections of each yoke form an envelope that encompasses the coil base 30. The P1 and P2 yoke sections are made narrow, about 10–30 micrometers ($\mu$m) for example, and the spacing between the yokes is effectively reduced to maximize the number of yokes within the area between the sides of the coil. Preferably the lateral spacing between adjacent yokes is more than one-half of the vertical spacing between the P1 and P2 sections of a yoke.

The thin film head design allows making the P1 and P2 sections of the yokes very narrow, with a minimum width that is close to the working track width of the head, defined by the width of the data tracks recorded on a magnetic medium, such as a magnetic disk. The ratio of yoke width to data track width can be in the range of about 1.25:1 to 6:1, but in any event the yoke width is no less than the track width. Very narrow yokes result in a lowered inductance and serve to improve high frequency response and increase the signal-to-noise (S/N) ratio.

The magnetic yokes are connected serially so that a continuous magnetic flux circuit is formed. To achieve a continuous connection between the yokes, the P2 section of yoke 10 is connected through via 22 to the P1 section of yoke 12, the P2 section of yoke 12 is connected through via 24 to the P1 section of yoke 14, and the P2 section of yoke 14 is connected through via 26 to the P1 section of yoke 16. A transducing gap 28 is provided between the end of the P1 section of the first yoke 10 and the P2 section of the last yoke 16 of the series of multiple yokes.

In the embodiment illustrated in FIGS. 1A and 1B, the coil 18 is configured with a base 30, parallel sides 32 and 34 and a topside (not shown) opposite to the base. Write current (i) is supplied to the coil 18 during the write mode and read signals are obtained from the coil during the read mode of the device.

During production of the multiple yoke thin film head of this invention, a P1 layer is deposited by well known masking and etching techniques. The P1 layer is designed with spaced P1 sections, one for each of the magnetic yokes 10, 12, 14, 16. Prior to the deposition of the P1 layer, a seed layer is formed over an alumina undercoat that was laid down on a polished surface of a ceramic substrate. A first insulating layer of aluminum oxide which provides the transducing gap 28 between the P1 section of yoke 10 and the P2 section of yoke 16 is then deposited. A patterned electrical coil structure 18 is then formed and defined by photolithography masking techniques and chemical etching. Only the half of the coil 18 which is linked to the multiple yokes is shown, with arrows indicating the flow of current. Insulating material is deposited to cover and insulate the coil structure 18 from the P1 and P2 magnetic layers. The P2 layer is then deposited with spaced P2 sections that make contact through vias 20a–20d with respective P1 sections at the back closures of each yoke, and with adjacent P1 sections through vias 22, 24 and 26, except for the P2 section of the last yoke 16. The P2 sections are coextensive with and superposed in alignment with the P1 sections along axes that are orthogonally disposed to the planar coil 18. A protective insulating overcoat is deposited over the head structure, by r.f. sputtering for example, to provide structural strength and protection during the machining and lapping of the air bearing slider or substrate on which the thin film head is formed. Bonding pads, interconnects and wiring to the head circuit are provided to conduct data signals from and to the head during the read and write modes.

The multiple yoke thin film magnetic head shown in FIGS. 1A and 1B provide an output signal approximately four times that obtained with a conventional inductive head. For a coil of a given resistance, the thin film head with multiple yokes as disclosed herein realizes a signal output about two times that available with the thin film head assembly of the head device described in the referenced application. The head configuration of FIGS. 1A and 1B allows a reduction in thermal noise with a resultant improvement in the signal-to-noise ratio.

Figure 2:
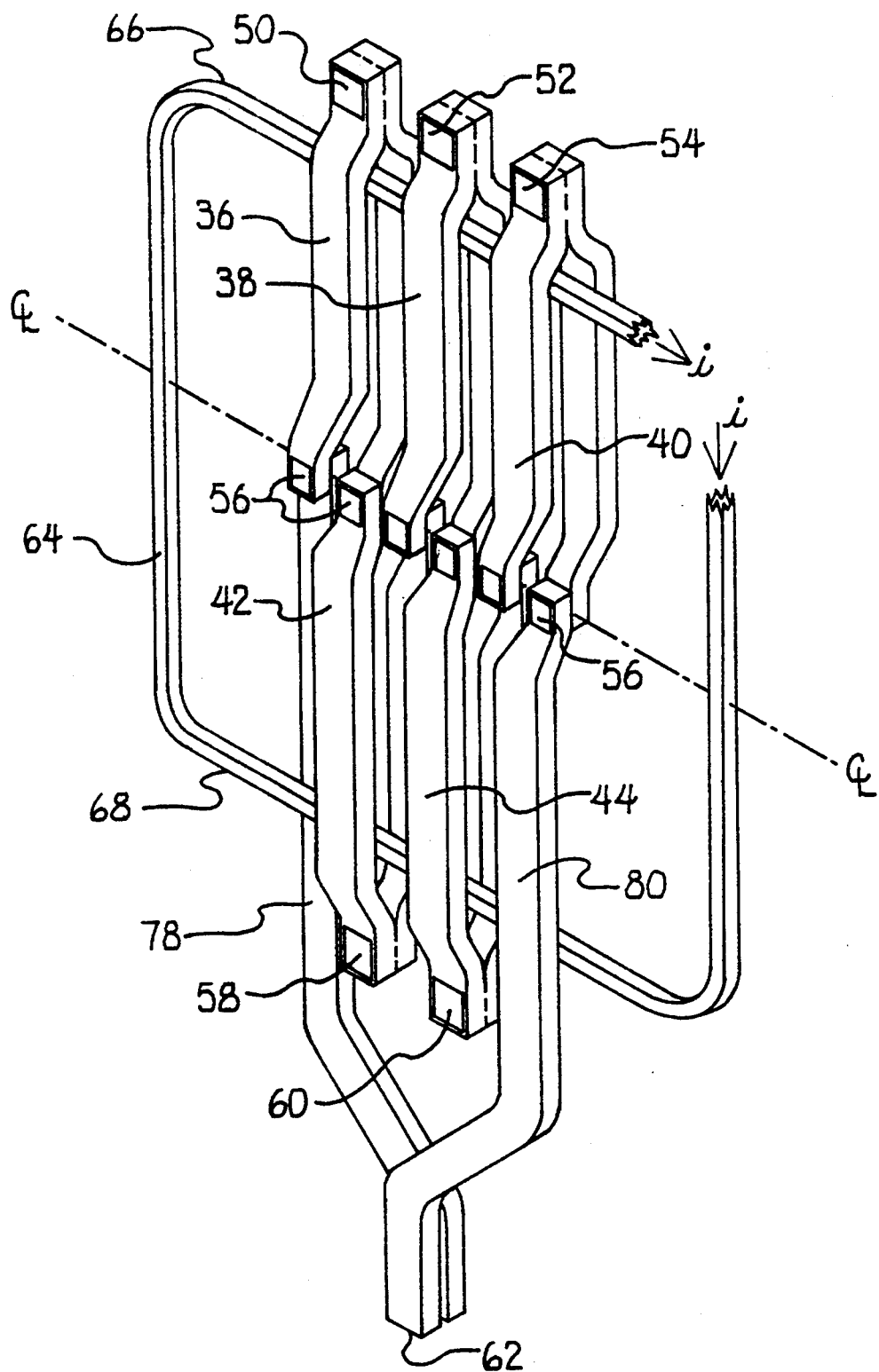
FIG. 2 is an isometric view depicting an alternative embodiment of the invention.

FIG. 2 depicts an alternative embodiment of the invention wherein the base 68 of coil 64 is inductively linked to magnetic full yokes 42 and 44 (the yokes having both P1 and P2 sections that form an envelope around the coil), and the opposing topside 66 of the coil is inductively coupled to magnetic yokes 36, 38 and 40. The magnetic circuit is completed by the one-half yokes comprising the P1 section 78 and the P2 section 80 which define the transducing gap. The ends of the coil 64 are connected to read/write circuitry for passing data signals to the head during the record mode and from the head during the read mode. The P1 and P2 sections of the yokes 36, 38 and 40 are connected at vias 50, 52 and 54 respectively. Similarly the P1 and P2 sections of yokes 42 and 44 are connected through vias 58 and 60. All of the yokes are tied at vias 56 to establish a continuous magnetic flux path. In contrast to the implementation of FIGS. 1A and 1B, the additional magnetic yoke envelopes 36, 38 and 40 increase the amount of flux linkage substantially. The foldover or envelope type structure of FIG. 2, wherein a plurality of yokes is inductively coupled to one part of the coil and a second plurality of yokes is inductively coupled to an opposite part of the coil affords a significant gain in signal output. The gain in signal realized with this implementation is approximately six times that of a conventional head using the same number of coil turns.

Figure 3:
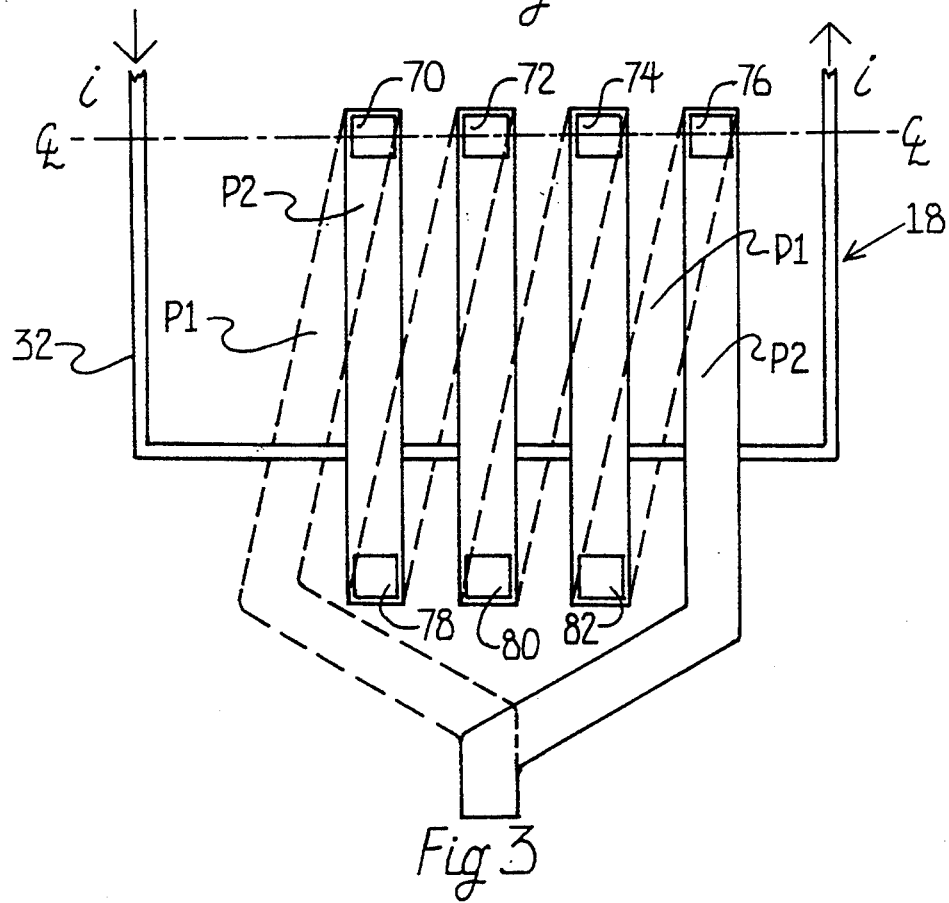
FIG. 3 is a plan view of another configuration using the inventive concept.

A variation of the novel design of a thin film head formed with yoke envelopes around a coil is illustrated in FIG. 3. In this implementation, the P1 yoke sections which are disposed below the plane of the coil 18 form an angle relative to the P2 yoke sections, which are formed above the coil layer and are substantially parallel to the sides 32 and 34 of the coil. The P1 and P2 yoke sections are connected through vias 70, 72, 74, 76 disposed along the centerline of the coil between the sides 32 and 34. The P1 and P2 yoke sections are also connected through vias 78, 80, 82 formed external to the perimeter of the coil 18. Another embodiment of the invention comprises angled yokes, as shown in FIG. 2, encompassing both the upper and lower parts of the coil.

As in the embodiment of FIGS. 1A and 1B, the overall height of the coil can be reduced from that used with conventional thin film heads, which typically require a coil height that is about 80% of the thickness of the head slider on which the thin film transducer is deposited. Thus a slider of smaller thickness can be used and space requirements reduced.

Figure 4:
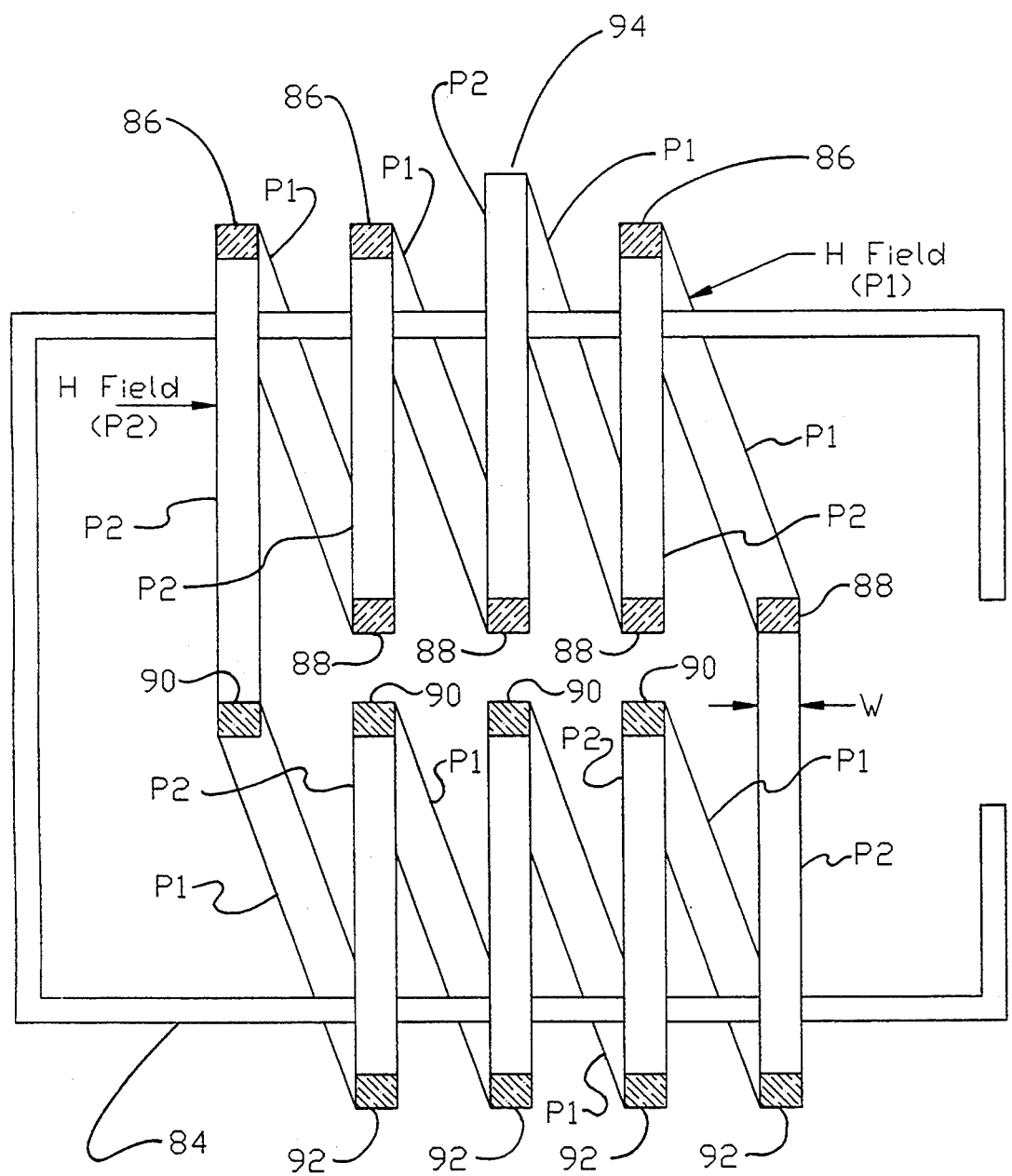
FIG. 4 is a plan view of an alternative configuration using the inventive concept.

With reference to FIG. 4, a yoke enevelope is formed with an array of substantially parallel P1 Permalloy strips and an array of substantially parallel P2 Permalloy strips. The P1 strips are disposed at an angle relative to opposing legs of a coil 84, whereas the P2 strips are disposed substantially perpendicular to the coil legs. The P1 and P2 strips are connected at vias 86 and 92 which are external to the coil 84 and at vias 88 and 90 which are interior to the coil 84. The connected strips encompass the coil legs at uniformly spaced areas. A transducing gap 94 is provided at the connection of the P1 and P2 elements located at the upper center of the yoke.

During plating of the P1 Permalloy strips, an orienting DC magnetic field H is applied at an angle orthogonal to the length of the P1 strips. During the subsequent plating of the P2 Permalloy strips, the apparatus for applying a second orienting DC magnetic field is shifted so that the applied field is substantially perpendicular to the P2 strips. Thus only two different angles of the applied magnetic field are needed during plating, thereby reducing labor and costs of fabrication.

In an embodiment of the design of FIG. 4, the yoke width is made to be within the range of 4–30 microns. The coil 84 can be made with multiple turns as well as a single turn.

With the head designs disclosed herein, multiple linkages between the magnetic circuit and the coil are obtained for the same number of coil turns used in conventional thin film heads. Thus a higher signal output per unit turn can be obtained with an improvement in operating efficiency. The thin film head configurations use a multiplicity of yokes that envelop a coil in a foldover configuration, the yokes being oriented relative to the coil so that a maximum number of flux linkages are obtained for a given area occupied by the coil. The closely spaced narrow magnetic yokes which are linked to multiple parts of a coil structure provide the advantages of increased signal output and reduced thermal noise.

It should be understood that modifications in design and the parameters of the disclosed thin film head structures may be made within the scope of the invention. For example, the coil structure used with the head design may incorporate more than a single planar coil and the coil may have more than a single turn. The coil can be other than square or rectangular in shape.

What is claimed is:

1. A thin film magnetic head comprising:
   an electrically conductive coil disposed in a single plane only, said coil characterized by a base and an opposing topside that is substantially parallel to said base and first and second parallel sides between said base and said topside;
   a plurality of magnetic flux yokes, each yoke comprising first and second magnetic sections, each magnetic section having a multiplicity of linear magnetic strips laterally spaced in an array along said base of said coil, said linear strips of said first magnetic section being disposed in a first plane on one side of the plane of said planar coil, said linear strips of said second magnetic section being disposed in a second plane on the other side of the plane of said planar coil;
   vias for providing connections between said strips of said first section and said strips of said second section so that said yokes are connected serially in a helical-type configuration to form a plurality of magnetic yoke envelopes that encompass only said coil base at a plurality of substantially equally spaced points for providing inductive couplings between said coil and said yokes, said vias being disposed in a line extending from said first side to said second side between said coil base and said topside, said line being in a plane that is perpendicular to and intersects with the single plane of said coil, wherein no magnetic material other than the magnetic material of the magnetic yoke sections connected by said vias are present in the intersecting plane;
   said magnetic strips having widths in the range of 10–30 micrometers;
   whereby multiple yoke sections envelop and interact with the coil base of the planar coil to increase inductive coupling and the output signal of the thin film magnetic head.

2. A thin film magnetic head as in claim 1, wherein the second section of each of said yokes is connected to the first section of the next yoke, excepting the second section of the last one of said yokes, an unconnected end of the first section of the first yoke and the unconnected end of the second section of the last one of said yokes providing a transducing gap therebetween.

3. A thin film magnetic head as in claim 1, wherein said second sections of each yoke are superposed and in substantial alignment relative to respective ones of said first sections along axes that are perpendicular to the plane of said coil.

4. A thin film magnetic head as in claim 1, wherein said coil, and are spaced laterally along the plane of said coil, and the lateral spacing between adjacent yokes is constantly greater than one-half of the vertical spacing between the first and second sections of said yokes.

5. A thin film magnetic head as in claim 1, wherein said coil is substantially rectangular or square.

6. A thin film magnetic head as in claim 1, wherein said vias are located along the centerline of said coil.

7. A thin film magnetic head as in claim 1, wherein said first magnetic sections are connected to respective second magnetic sections at back closures.

8. A thin film magnetic head as in claim 1, wherein the widths of each yoke relative to data track width is in the range of about 1.25:1 to 8.0:1.

9. A thin film magnetic head as in claim 1, wherein said vias are disposed in row and columnar alignment.

* * * * *